BEST AVAILABLE COPY

DEFENSIVE PUBLICATION T857,020

UNITED STATES PATENT OFFICE

Published at the request of the applicant or owner in accordance with the Notice of Apr. 11, 1968, 849 O.G. 1221. Identification is by serial number of the application and the heading indicates the number of pages of specification, including claims, and of sheets of drawing contained in the application as originally filed. The file of this application is available to the public for inspection; reproduction may be purchased for 30 cents per sheet.

Applications published under the Defensive Publication Program have not been examined as to the merits of alleged invention. The Patent Office makes no assertion as to the novelty of the disclosed subject matter.

PUBLISHED DECEMBER 10, 1968

857 O.G. 368

686,834

DISAZO COMPOUNDS CONTAINING A PYRROLIDINONO, PIPERIDONO OR PHTHALIMIDINO RADICAL

Max A. Weaver and James M. Straley, both % Tennessee Eastman Company, P.O. Box 511, Kingsport, Tenn. 37662

Filed Nov. 30, 1967. Published Dec. 10, 1968
Class 260—152
No Drawing. 14 Pages Specification

Disazo compounds containing a pyrrolidinono, piperidono, or phthalimidino radical attached to a nuclear carbon atom of a benzene diazo component and having a phenolic coupling component are useful as dyes for hydrophobic textile materials.